(12) United States Patent
Delia et al.

(10) Patent No.: US 8,356,345 B2
(45) Date of Patent: Jan. 15, 2013

(54) CONSTRUCTING A SECURE INTERNET TRANSACTION

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 12/332,493

(22) Filed: Dec. 11, 2008

(65) Prior Publication Data

US 2009/0300749 A1    Dec. 3, 2009

Related U.S. Application Data

(63) Continuation-in-part of application No. 12/132,203, filed on Jun. 3, 2008, now Pat. No. 8,055,587.

(51) Int. Cl.
*H04L 29/00*    (2006.01)
(52) U.S. Cl. ............................. 726/12; 726/11
(58) Field of Classification Search ............... 726/11–12
See application file for complete search history.

(56) References Cited

U.S. PATENT DOCUMENTS

| | | |
|---|---|---|
| 5,875,296 A | 2/1999 | Shi et al. |
| 6,085,224 A | 7/2000 | Wagner |
| 6,092,196 A | 7/2000 | Reiche |
| 6,112,240 A | 8/2000 | Pogue et al. |
| 6,205,480 B1 | 3/2001 | Broadhurst et al. |
| 6,226,752 B1 | 5/2001 | Gupta et al. |
| 6,304,906 B1 | 10/2001 | Bhatti et al. |
| 6,374,359 B1 * | 4/2002 | Shrader et al. .............. 726/5 |
| 6,651,217 B1 | 11/2003 | Kennedy et al. |
| 6,665,634 B2 | 12/2003 | Taft et al. |
| 6,714,926 B1 | 3/2004 | Benson |
| 6,714,930 B1 | 3/2004 | Garrison et al. |
| 6,725,269 B1 | 4/2004 | Megiddo |

(Continued)

FOREIGN PATENT DOCUMENTS

JP    2001274786 A    10/2001

(Continued)

OTHER PUBLICATIONS

International Search Report; International Application No. PCT/EP2009/056500; International Filing Date: May 28, 2009; Date of mailing: Dec. 21, 2009; 9 pages.

(Continued)

*Primary Examiner* — Philip Chea
*Assistant Examiner* — Ghazal Shehni
(74) *Attorney, Agent, or Firm* — Cantor Colburn LLP

(57) ABSTRACT

A method for constructing a secure Internet transaction, the method includes: receiving a user identification (userid) and user password on a client device for filling out a form generated by a secure web site; concatenating the user's Internet Protocol (IP) address with a separate password that is maintained on the secure web site that the user is authenticating to; encrypting the concatenated user IP and separate password to form an Internet Protocol password (IPPW); wherein the encrypting is carried out with asymmetric public-key cryptography using a public key; building a transaction consisting of the IPPW and userid; transmitting the transaction and form via a network towards the secure web site; wherein in response the secure website performs the following: decrypts the IPPW, and determines if the IP portion of the decrypted IPPW is equal to the user's IP address.

15 Claims, 3 Drawing Sheets

U.S. PATENT DOCUMENTS

| | | |
|---|---|---|
| 6,751,654 B2 | 6/2004 | Massarani et al. |
| 6,751,736 B1 | 6/2004 | Bowman et al. |
| 6,789,115 B1 | 9/2004 | Singer et al. |
| 6,836,845 B1 | 12/2004 | Lennie et al. |
| 6,851,060 B1 | 2/2005 | Shrader |
| 6,909,785 B1 | 6/2005 | Rose |
| 6,970,933 B1 | 11/2005 | Masters |
| 6,973,580 B1 | 12/2005 | Carroll et al. |
| 6,975,730 B1 | 12/2005 | Kuroiwa et al. |
| 6,976,077 B1 | 12/2005 | Lehew et al. |
| 7,010,605 B1 | 3/2006 | Dharmarajan |
| 7,020,705 B2 | 3/2006 | Wang et al. |
| 7,085,744 B2 | 8/2006 | Morrison |
| 7,100,049 B2 | 8/2006 | Gasparini et al. |
| 7,124,203 B2 | 10/2006 | Joshi et al. |
| 7,155,605 B1 | 12/2006 | Cromer et al. |
| 7,171,564 B2 | 1/2007 | Kelley et al. |
| 7,185,364 B2 | 2/2007 | Knouse et al. |
| 7,188,181 B1 | 3/2007 | Squier et al. |
| 7,194,764 B2 | 3/2007 | Martherus et al. |
| 7,200,863 B2 | 4/2007 | Shuster |
| 7,225,256 B2 | 5/2007 | Villavicencio |
| 7,231,661 B1 | 6/2007 | Villavicencio et al. |
| 7,249,369 B2 | 7/2007 | Knouse et al. |
| 7,281,130 B2 | 10/2007 | Johnson et al. |
| 7,287,084 B1 | 10/2007 | Masters |
| 7,293,098 B2 | 11/2007 | Sandhu et al. |
| 7,302,480 B2 | 11/2007 | Lahtinen |
| 7,334,013 B1 | 2/2008 | Calinov et al. |
| 7,340,496 B2 | 3/2008 | Burdine et al. |
| 7,346,775 B2 | 3/2008 | Gasparinl et al. |
| 2001/0027439 A1* | 10/2001 | Holtzman et al. ............. 705/39 |
| 2002/0095388 A1* | 7/2002 | Yu et al. ........................ 705/67 |
| 2003/0188012 A1 | 10/2003 | Ford |
| 2004/0044896 A1 | 3/2004 | Kelley et al. |
| 2004/0158746 A1 | 8/2004 | Hu et al. |
| 2008/0104672 A1 | 5/2008 | Lunde et al. |
| 2008/0115214 A1 | 5/2008 | Rowley |
| 2009/0300749 A1 | 12/2009 | Delia et al. |
| 2010/0036893 A1 | 2/2010 | Serval et al. |

FOREIGN PATENT DOCUMENTS

| | | |
|---|---|---|
| JP | 2002091828 A | 3/2002 |
| JP | 2003514438 A | 4/2003 |
| JP | 2010508588 A | 3/2010 |
| WO | 2008052128 A2 | 5/2008 |

OTHER PUBLICATIONS

Response to Final Office Action filed May 16, 2011 for U.S. Appl. No. 12/132,203.

Final Office Action dated Feb. 17, 2011 for U.S. Appl. No. 12/132,203.

Response to Nonf-inal Office Action filed Nov. 30, 2012 for U.S. Appl. No. 12/132,203.

Non-final Office Action dated Sep. 17, 2010 for U.S. Appl. No. 12/132,203.

Notice of Allowance dated Jun. 29, 2012 for U.S. Appl. No. 12/132,203.

* cited by examiner

CONSTRUCTING A SECURE INTERNET TRANSACTION

CROSS-REFERENCE TO RELATED APPLICATIONS

This non-provisional U.S. Patent Application is a continuation-in-part of pending U.S. patent application Ser. No. 12/132,203, which was filed Jun. 3, 2008, and is assigned to the present assignee.

BACKGROUND OF THE INVENTION

1. Field of the Invention

The present invention relates generally to computer network security, and more particularly, to a method, article, and system for defeating the 'man in the middle' computer hacking technique.

2. Description of the Related Art

The growth of Internet commerce, and the widespread use of the Web to carryout financial transactions have lead to the introduction of Internet crime and computer network hacking. Hacking refers to attempts to defeat or exploit the security capabilities of a computer system.

One of the most difficult computer security problems to deal with involves hackers using a 'man in the middle' scheme. In the 'man in the middle' scheme, a hacker is able to convince an unsuspecting user that the hacker's web site is a legitimate web site for carrying out a transaction, such as an online banking web site, etc. The hacker's illegitimate web site logs on to a real transaction web site (bank web site, etc.) and relays all of the information requested by the transaction web site that is used to authenticate the user to the site, back to the user that is being deceived. For example, in the event a bank requests a userid and password, the request is forwarded to the unsuspecting user, by the 'man in the middle', and when the information is supplied, the hacker uses the information to gain access to the bank web site in place of the legitimate user.

The hacker sends intercepted transactions that are requested by the legitimate user to the bank's web site, and the bank's transaction responses are also intercepted by the hacker and sent back to the user. The intercepted transactions are transparent to both the legitimate user and the authorized web site, resulting in a transaction that the user believes was carried out while directly being logged onto the bank's web site. In general, the intercepted transaction will be successful from the standpoint of the legitimate user; however, the hacker has now also gained access to the userid and password of the legitimate user. The hacker is now free to logon to the bank web site as the legitimate user and withdraw money from the user's account.

There are several methods employed by hackers to place themselves between (man in the middle) legitimate users and their intended web sites. One method, widely known as phishing, involves the sending of emails to a user and convincing the user to select a uniform resource locator (URL) contained in the email. The URL contained in the phishing email subsequently sends the user to the hacker's web site, which appears as an exact duplicate of the intended web site. Additional methods utilized by hackers include a phony web site URL on a pop-up window, corrupting a user host file so that it changes a bank URL to the URL of the hacker's phony web site, and setting up a rogue WiFi access point, which collects and retains input of sensitive account information. Related to methods for the man in the middle hacker scheme, but much more destructive, is the situation in which a hacker gains access to a Domain Name Server (DNS). DNSs exist to translate a URL, which is an alphanumeric alias for an Internet Protocol (IP) address, to the actual numeric IP address, so that a communication connection to the IP address may be enabled.

Finally, another known method employed by hackers is Keylogging. Keylogging is a technological process of monitoring computer activity by recording, transmitting, and examining the characters typed on a computer keyboard. Employers monitoring employee productivity, typically involving clerical tasks sometimes use the keylogging technique. Other, more nefarious implementations of keylogging programs involve espionage, such as those embodied in spyware programs. These programs attempt to gather confidential information, such as a text string including an account name and password, and particularly a text string of keyboard strokes following input of a particular web site address. For example, a mouse click on a web browser icon displays the configured home page. A keyboard is used to enter a secure banking web site universal resource locator (URL) in the address input box. Following that, an account number and password are keyed in to the respective input fields. A malicious spyware program records the keystrokes entered on the keyboard, and that sequence of keystrokes is sent to an unknown third party for possible fraudulent use.

Keylogging programs, once installed and activated on a computer system, are extremely difficult to detect. Commercial and freeware spyware detection programs are available, but they are only useful against identified threats listed in the anti-spyware definitions file. However, standard anti-spyware detection programs may not identify new and more recent variations of spyware keylogger programs.

Keylogging programs generally work on the principle of detecting basic input/output system (BIOS) signals sent from what is assumed to be a standard keyboard layout (e.g., "QWERTY", "DVORAK", or other standard international keyboard layouts). Windows Vista and other popular operating systems and application software enable "re-mapping" of a computer keyboard. While this technique will thwart keyloggers, it is largely unused by the majority of computer users because the remapped keyboard departs from what is traditionally coordinated with the "muscle memory" of touch typists familiar with standard keyboard layouts. Other solutions to thwart keylogging involve displaying a keyboard on a monitor, from which input letters are selected with the mouse to enter the alphabetic and numeric characters in the input fields into the web form area that is used to contain the password. A variation of this method is to copy and paste the confidential information from a file. However, such approaches carry the risk of being defeated by hackers through the use of capturing and transmitting screen shots of completed forms, which are then analyzed for the confidential information.

Asymmetric cryptography, also known as public-key cryptography is a form of cryptography in which the key used to encrypt a message differs from the key used to decrypt it. In asymmetric cryptography, a user has a pair of cryptographic keys—a public key and a private key. The private key is kept secret, while the public key may be widely distributed. In asymmetric cryptography an incoming transaction, data, or message is encrypted with the recipient's public key and may only be decrypted with their corresponding private key. The keys are related mathematically, but the private key cannot be practically derived from the public key. Conversely, secret key cryptography, also known as symmetric cryptography, uses a single secret key for both encryption and decryption. To use symmetric cryptography for communication, both the sender and receiver would have to know the key beforehand, or it would have to be sent along with the message.

The two main branches of asymmetric cryptography are public key encryption and digital signatures. In public key encryption a message encrypted with a recipient's public key cannot be decrypted by anyone except the recipient possessing the corresponding private key. Public key encryption is used to ensure confidentiality. Digital signatures provide a message signed with a sender's private key that may be verified by anyone who has access to the sender's public key, thereby proving that the sender signed it, that the message has not been tampered with, and to ensure authenticity.

SUMMARY OF THE INVENTION

Embodiments of the present invention include a method, article, and system for constructing a secure Internet transaction, the method includes: receiving a user identification (userid) and user password on a client device for filling out a web site form generated by a secure web site; concatenating the user's Internet Protocol (IP) address with a separate password that is maintained on the secure web site that the user is authenticating to; encrypting the concatenated user IP and separate password to form an Internet Protocol password (IPPW); wherein the encrypting is carried out with asymmetric public-key cryptography using a public key; building a transaction consisting of the IPPW, and the userid; transmitting the transaction and filled out web site form via a network towards the secure web site; wherein in response to receiving the transmitted transaction and filled out web site form, the secure website performs the following: retrieving a private key that is associated with the public key used in the asymmetric public-key cryptography used to encrypt the IPPW; decrypting the IPPW with the private key; determining if the IP portion of the decrypted IPPW is equal to the user's IP address; and wherein in the event the IP portion of the decrypted IPPW is equal to the user's IP address, the secure website proceeds to request transaction data from the user.

An article comprising one or more computer-readable storage media containing instructions that when executed by a computer enables a method for constructing a secure Internet transaction, wherein the method further includes: receiving a user identification (userid) and user password on a client device for filling out a web site form generated by a secure web site; concatenating the user's Internet Protocol (IP) address with a separate password that is maintained on the secure web site that the user is authenticating to; encrypting the concatenated user IP and separate password to form an Internet Protocol password (IPPW); wherein the encrypting is carried out with asymmetric public-key cryptography using a public key; building a transaction consisting of the IPPW, and the userid; transmitting the transaction and filled out web site form via a network towards the secure web site; wherein in response to receiving the transmitted transaction and filled out web site form, the secure website performs the following: retrieving a private key that is associated with the public key used in the asymmetric public-key cryptography used to encrypt the IPPW; decrypting the IPPW with the private key; determining if the IP portion of the decrypted IPPW is equal to the user's IP address; and wherein in the event the IP portion of the decrypted IPPW is equal to the user's IP address, the secure website proceeds to request transaction data from the user.

A system for secure Internet transactions, the system includes: one or more server devices in communication with one or more client devices through a network; the server devices and the client devices configured to execute electronic software; wherein the electronic software is resident on storage mediums in signal communication with the client and server devices; wherein the electronic software comprises a series of instructions configured for: receiving a user identification (userid) and user password on a client device from the one or more client devices for filling out a web site form generated by a secure web site found on a server from the one or more server devices; concatenating the user's Internet Protocol (IP) address with a separate password that is maintained on the secure web site that the user is authenticating to; encrypting the concatenated user IP and separate password to form an Internet Protocol password (IPPW); wherein the encrypting is carried out with asymmetric public-key cryptography using a public key; building a transaction consisting of the IPPW and the userid; transmitting the transaction and filled out web site form via the network towards the secure web site; wherein in response to receiving the transmitted transaction and filled out web site form, the secure website performs the following: retrieving a private key that is associated with the public key used in the asymmetric public-key cryptography used to encrypt the IPPW; decrypting the IPPW with the private key; determining if the IP portion of the decrypted IPPW is equal to the user's IP address; and wherein in the event the IP portion of the decrypted IPPW is equal to the user's IP address, the secure website proceeds to request transaction data from the user.

TECHNICAL EFFECTS

As a result of the summarized invention, a solution is technically achieved for a method and system for constructing a secure Internet transaction that requires a value of an originating Internet Protocol (IP) address be encrypted and combined with an account password accompanying an Internet transaction for authentication at a secure transaction web site.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the invention provide a method, article, and system for constructing a secure Internet transaction that requires a value of an originating Internet Protocol (IP) address be encrypted and combined with an account password accompanying an Internet transaction for authentication at a secure transaction web site. Even though the actual value of an IP address in a network client-server configuration is easily discoverable, when the IP address is included as part of an encrypted transaction credentials, according to embodiments of the invention, a host server authorization routine, at a secure web site, is strengthened by requiring that the encrypted IP address in the transaction form input must correspond to the IP address of the computer sending the transaction.

In most legitimate secure transactions, the transaction form input does come from the originating IP address of the transaction sender's computer. However, in the situation of the man in the middle problem described above, the encrypted IP address in the transaction form input from the original sender's computer would not match the easily-discoverable different IP address of the computer operated by the "man in the middle" hacker. Thus a transaction carried out with embodiments of the invention, which has been intercepted by a man in the middle hacker, will be discovered and the transaction will be aborted.

Embodiments of the invention are equally effective in scenarios in which the interceptor manually forwards information to the destination transaction server, as well as automated hacking strategies requiring no human manual intervention.

Embodiments of the invention may be configured to provide information of detected authorization infractions, such as man in the middle schemes, available to authorities, such as local and federal law enforcement officials. The detected authorization infractions may be transmitted to authorities in real time, in cooperation with Internet Service Providers (ISPs), and may serve to quickly identify situations in which a hacker attempts to access a secure web site with intercepted credentials, which in some instances may be against local and federal laws.

Figure 1:
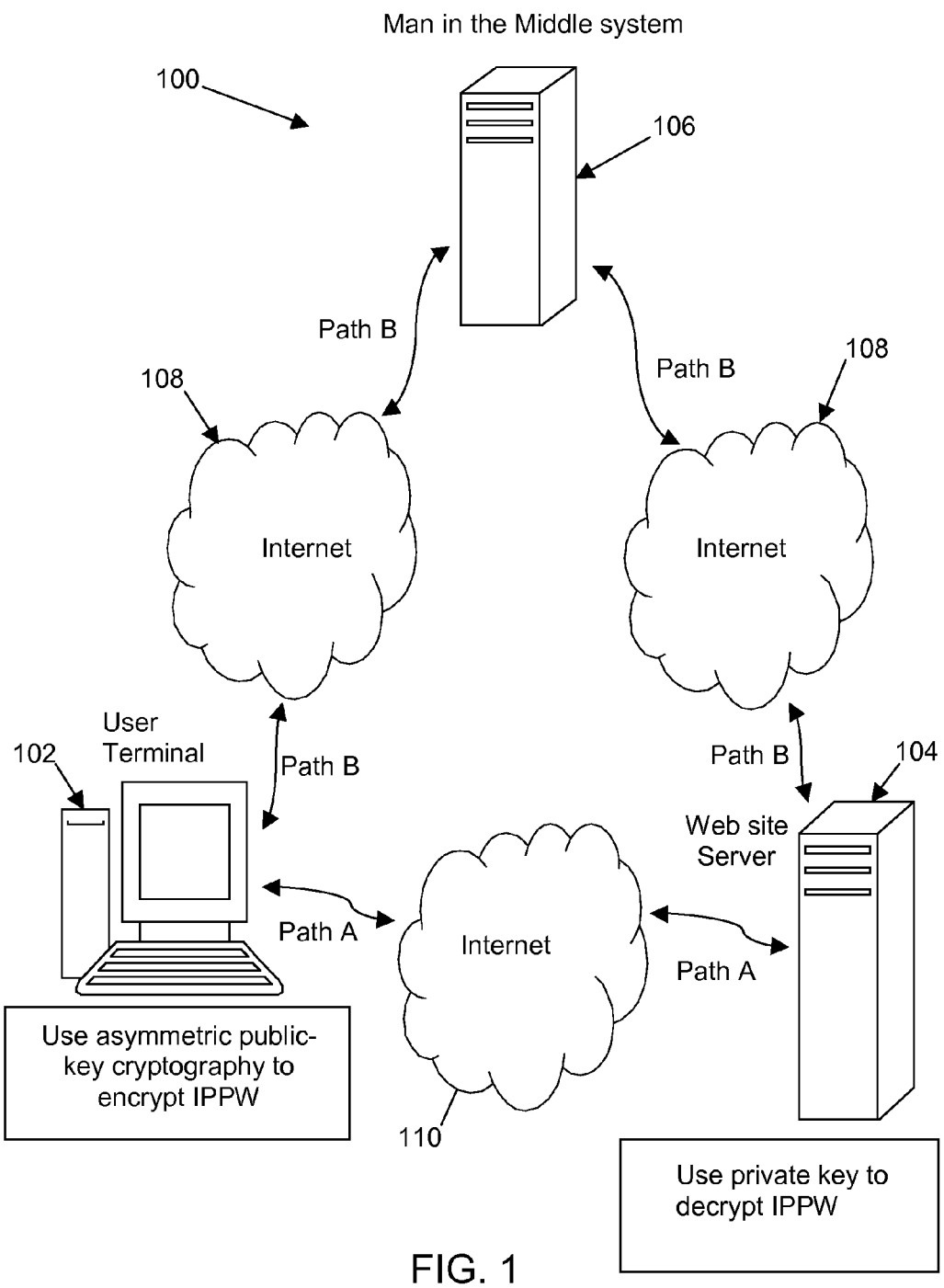
FIG. 1 is a block diagram of an exemplary system for defeating the man in the middle scheme according to embodiments of the invention.

FIG. 1 is a block diagram of an exemplary system 100 for defeating the man in the middle scheme according to embodiments of the invention. A user at terminal 102 accesses a web site form generated by an authorized web site server 104. The web site form is either transmitted directly to the user either via Internet direct path A 110, or is first intercepted by a man in the middle system 106, which lies in Internet path B 108. The man in the middle system 106 transmits an unaltered web site form to the user terminal 102. Therefore, the user at terminal 102 is unaware if the web site form has been intercepted or not, and is thus unaware of the man in the middle scheme. However, with embodiments of the present invention the user is protected from the man in the middle scheme as follows. The user fills in their user identification (userid) and password in the web site form at terminal 102, as they normally would do. However, with embodiments of the invention, the user terminal 102 is configured with asymmetric public-key cryptography to encrypt the IP address and the password and that is included in a transaction.

Continuing with the exemplary system 100 of FIG. 1 for defeating the man in the middle scheme according to embodiments of the invention, the completed web site form and transaction is then sent via the Internet for further processing.

In the event Internet path B 108 is used with the man in the middle server 106. The man in the middle server 106 intercepts and sends the form and transaction to the authorized web site server 104. The authorized web site server 104 uses a private key that is associated with the asymmetric public-key cryptography public key that encrypted the IPPW to decrypt the IP address and password of the intended user. In the event the IP address that has been decrypted does not match the IP address of the intended user, the authorized web site server 104 will not respond to the man in the middle server 106, thereby defeating the attempt of the man in the middle hacker.

Figure 2:
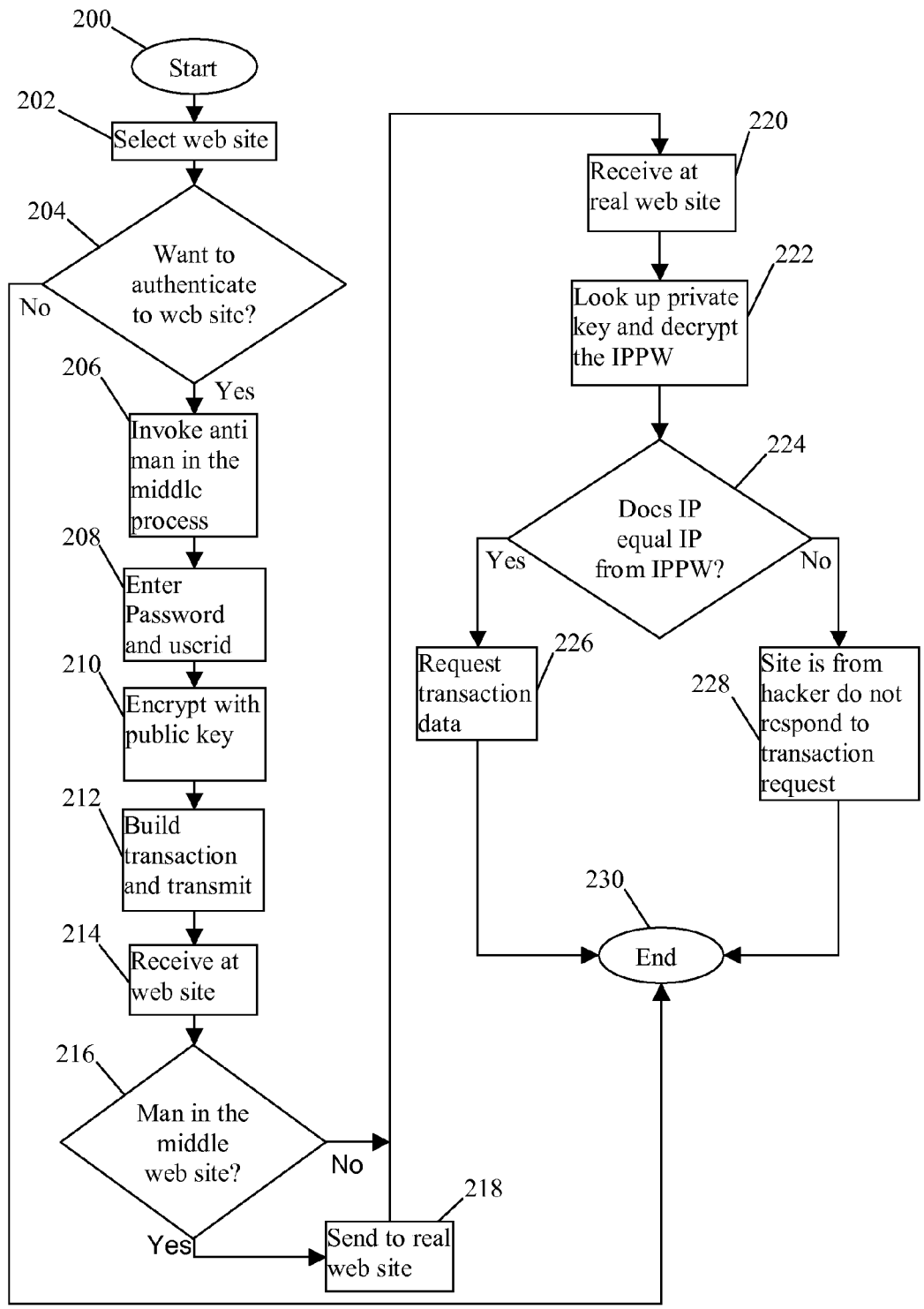
FIG. 2 is a flowchart illustrating the anti man in the middle measures according to embodiments of the invention.

FIG. 2 is a flowchart illustrating the anti man in the middle measures according to embodiments of the invention. The process starts (block 200) with a user selecting a desired Internet site and accessing the site (block 202), and determining if the site requires authentication (decision block 204). In the event the user chooses authentication, or it is required by the web site (decision block 204 is Yes), the anti man in the middle measures of embodiments of the invention are invoked (block 206), or else (decision block 204 is No) the process ends (block 230). With the invocation of the anti man in the middle measures of the present invention, the user enters their user identification (userid) and password on the form generated by the website on the user's web browser (block 208).

Subsequently, the user's IP address is concatenated with a separate password that is maintained on the web site that the user is authenticating to, and encrypted with asymmetric public-key cryptography using a public key that is resident on the client (user) computer (block 210). A transaction is built consisting of the encrypted IP address concatenated with the separate password, and is referred to as an Internet Protocol password (IPPW). The user's account id is added to the IPPW, and transmitted with the web site form via the Internet towards the desired web site (block 212). The form and transaction transmission is received at a web site (block 214), and in the event the web site is actually a man in the middle web site (decision block 216 is Yes), the form and transaction transmission is forwarded, by the man in the middle site, to the intended web site (block 218), and received at the intended real web site (block 220).

Continuing with the flowchart of FIG. 2, the intended real web site uses the private key that is associated with the asymmetric public-key cryptography public key that encrypted the IPPW, and decrypts the IPPW (block 222). A determination is made if the first part of the decrypted IPPW is equal the IP address of the user (decision block 224). In the event the IP address of the user matches the first portion of the decrypted IPPW (decision block 224 is Yes), the man in the middle scheme is not in effect, the authentication request has come directly from the legitimate user, and the web site proceeds to request transaction data from the user (block 226), and the process ends (block 230). In the event the IP address of the user does not match the first portion of the decrypted IPPW (decision block 224 is No), the man in the middle scheme is in effect, and the request is from a hacker acting as the Man in the Middle. In this instance the web site does not respond to the transaction request (block 228), and the process ends (block 230).

Figure 3:
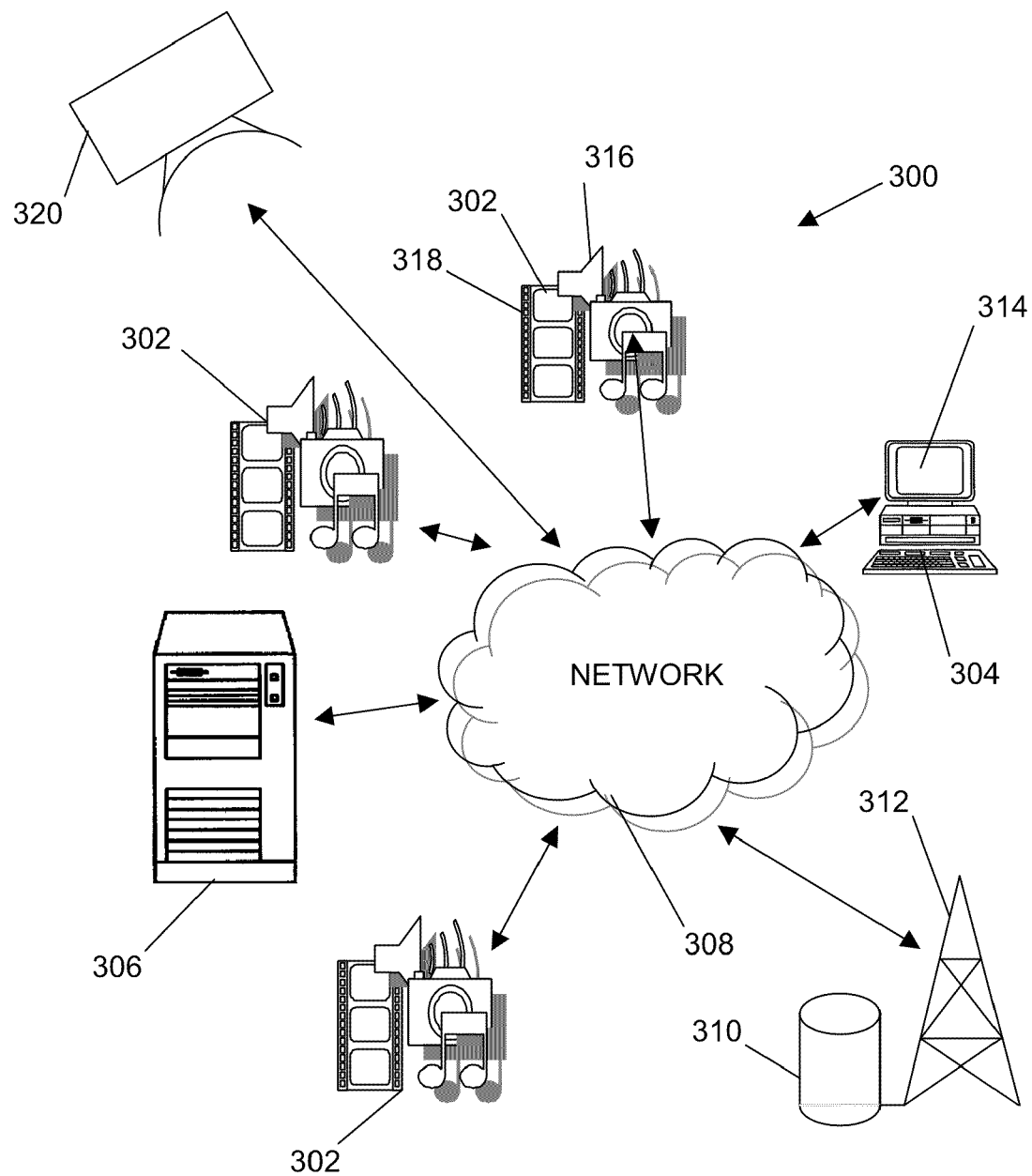
FIG. 3 is a block diagram of an exemplary system for implementing embodiments of the invention.

FIG. 3 is a block diagram of an exemplary system for implementing anti man in the middle measures of embodiments of the invention. The system 300 includes remote devices in the form of multimedia devices 302, and desktop computer devices 304 configured with display capabilities 314 for implementing graphical user interface (GUI) aspects of the invention described herein. The multimedia devices 302 may be mobile communication and entertainment devices, such as cellular phones and mobile computing devices that are wirelessly connected to a network 308. The multimedia devices 302 have video displays 318 and audio outputs 316 for implanting the GUI described herein. The network 308 may be any type of known network including a fixed wire line network, cable and fiber optics, over the air broadcasts, satellite 320, local area network (LAN), wide area network (WAN), global network (e.g., Internet), intranet, etc. with data/Internet capabilities as represented by server 306. Communication aspects of the network are represented by cellular base station 310 and antenna 312.

Software for carrying out features of embodiments of the invention may be resident on the individual multimedia devices 302 and desktop computers 304, or stored within the server 306 or cellular base station 310.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for constructing a secure Internet transaction, the method comprising:
    receiving a user identification (userid) and user password on a client device from a user for filling out a web site form generated by a secure web site that the user is authenticating to;
    concatenating, on the client device, the user's Internet Protocol (IP) address with a separate password that is maintained on the secure web site that the user is authenticating to;
    encrypting, on the client device, the concatenated user IP and separate password to form an Internet Protocol password (IPPW);
    wherein the encrypting is carried out with asymmetric public-key cryptography using a public key;
    building a transaction consisting of the IPPW, and the userid;
    transmitting the transaction and filled out web site form via a network towards the secure web site;
    wherein in response to receiving the transmitted transaction and filled out web site form, the secure website performs the following:
        retrieving a private key that is associated with the public key used in the asymmetric public-key cryptography used to encrypt the IPPW;
        decrypting the IPPW with the private key;
        determining if the IP portion of the decrypted IPPW is equal to the user's IP address; and
        wherein in the event the IP portion of the decrypted IPPW is equal to the user's IP address, the secure website proceeds to request transaction data from the user.

2. The method of claim 1, wherein in the event the IP portion of the decrypted IPPW is not equal to the user's IP address, the secure website determines that an authorization infraction has occurred, and the secure website does not respond to the transaction.

3. The method of claim 2, wherein the authorization infraction is reported to authorities.

4. The method of claim 1, wherein the network is the Internet.

5. The method of claim 1, wherein a graphical user interface (GUI) is configured for filling out the web site form.

6. An article comprising one or more non-transitory computer-readable storage media containing instructions that when executed by a computer enables a method for constructing a secure Internet transaction, wherein the method further comprises:
    receiving a user identification (userid) and user password on a client device from a user for filling out a web site form generated by a secure web site that the user is authenticating to;
    concatenating, on the client device, the user's Internet Protocol (IP) address with a separate password that is maintained on the secure web site that the user is authenticating to;
    encrypting, on the client device, the concatenated user IP and separate password to form an Internet Protocol password (IPPW);
    wherein the encrypting is carried out with asymmetric public-key cryptography using a public key;
    building a transaction consisting of the IPPW, and the userid;
    transmitting the transaction and filled out web site form via a network towards the secure web site;
    wherein in response to receiving the transmitted transaction and filled out web site form, the secure website performs the following:
        retrieving a private key that is associated with the public key used in the asymmetric public-key cryptography used to encrypt the IPPW;
        decrypting the IPPW with the private key;
        determining if the IP portion of the decrypted IPPW is equal to the user's IP address; and
        wherein in the event the IP portion of the decrypted IPPW is equal to the user's IP address, the secure website proceeds to request transaction data from the user.

7. The article of claim 6, wherein in the event the IP portion of the decrypted IPPW is not equal to the user's IP address, the secure website determines that an authorization infraction has occurred, and the secure website does not respond to the transaction.

8. The article of claim 7, wherein the authorization infraction is reported to authorities.

9. The article of claim 6, wherein the network is the Internet.

10. The article of claim 6, wherein a graphical user interface (GUI) is configured for filling out the web site form.

11. A system for secure Internet transactions, the system comprising:
    one or more server devices in communication with one or more client devices through a network;
    the server devices and the client devices configured to execute electronic software;
    wherein the electronic software is resident on storage mediums in signal communication with the client and server devices;
    wherein the electronic software comprises a series of instructions configured for:

receiving a user identification (userid) and user password on a client device from the one or more client devices for filling out a web site form generated by a secure web site found on a server from the one or more server devices;

concatenating on the client device the user's Internet Protocol (IP) address with a separate password that is maintained on the secure web site that the user is authenticating to;

encrypting on the client device the concatenated user IP and separate password to form an Internet Protocol password (IPPW);

wherein the encrypting is carried out with asymmetric public-key cryptography using a public key;

building a transaction consisting of the IPPW and the userid;

transmitting the transaction and filled out web site form via the network towards the secure web site;

wherein in response to receiving the transmitted transaction and filled out web site form, the secure website performs the following:

retrieving a private key that is associated with the public key used in the asymmetric public-key cryptography used to encrypt the IPPW;

decrypting the IPPW with the private key;

determining if the IP portion of the decrypted IPPW is equal to the user's IP address; and wherein in the event the IP portion of the decrypted IPPW is equal to the user's IP address, the secure website proceeds to request transaction data from the user.

12. The system of claim 11, wherein in the event the IP portion of the decrypted IPPW is not equal to the user's IP address, the secure website determines that an authorization infraction has occurred, and the secure website does not respond to the transaction.

13. The system of claim 12, wherein the authorization infraction is reported to authorities.

14. The system of claim 11, wherein the network is the Internet.

15. The system of claim 11, wherein a graphical user interface (GUI) is configured for filling out the web site form.

* * * * *